United States Patent
Monji

(10) Patent No.: US 11,724,548 B2
(45) Date of Patent: Aug. 15, 2023

(54) TIRE

(71) Applicant: Sumitomo Rubber Industries, Ltd., Kobe (JP)

(72) Inventor: Mami Monji, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 383 days.

(21) Appl. No.: 17/060,778

(22) Filed: Oct. 1, 2020

(65) Prior Publication Data

US 2021/0155050 A1    May 27, 2021

(30) Foreign Application Priority Data

Nov. 25, 2019  (JP) .................. 2019-212403
Apr. 28, 2020  (JP) .................. 2020-079585

(51) Int. Cl.
  *B60C 11/12*   (2006.01)
  *B60C 11/13*   (2006.01)
  *B60C 11/03*   (2006.01)

(52) U.S. Cl.
  CPC ........ *B60C 11/0309* (2013.01); *B60C 11/125* (2013.01); *B60C 11/1259* (2013.01);
  (Continued)

(58) Field of Classification Search
  CPC .............. B60C 11/1369; B60C 11/125; B60C 2011/1361; B60C 2011/0381; B60C 2011/0383; B60C 2011/0369
  See application file for complete search history.

(56) References Cited

U.S. PATENT DOCUMENTS

| | | | |
|---|---|---|---|
| 9,302,549 B2 * | 4/2016 | Atake | B60C 11/125 |
| 2010/0186861 A1 * | 7/2010 | Ishiguro | B60C 11/1369 |
| | | | 152/209.25 |

(Continued)

FOREIGN PATENT DOCUMENTS

| | | | |
|---|---|---|---|
| EP | 0602989 | * | 6/1994 |
| EP | 3 093 162 A1 | | 11/2016 |

(Continued)

OTHER PUBLICATIONS

Extended European Search Report for European Application No. 20208798.7, dated Apr. 22, 2021.

*Primary Examiner* — Robert C Dye
(74) *Attorney, Agent, or Firm* — Birch, Stewart, Kolasch & Birch, LLP

(57) ABSTRACT

A tyre includes a tread portion being provided with a longitudinal groove and a land portion being adjacent to the longitudinal groove. The land portion has a ground contact surface defined between a first circumferential edge located on the longitudinal groove side and a second circumferential edge located on an opposite side to the first circumferential edge. The land portion is provided with first lateral grooves and sipes. The first lateral grooves extend from the first circumferential edge and having inner ends thereof terminating within the land portion. The first lateral grooves are provided with tie-bars on the respective inner ends side, the tie-bars having lengths smaller than lengths of the respective first lateral grooves. The sipes include first sipe elements extending form the second circumferential edge to the respective first lateral grooves and second sipe elements extending on the respective tie-bars.

18 Claims, 7 Drawing Sheets

(52) U.S. Cl.
CPC ... *B60C 11/1369* (2013.01); *B60C 2011/0362* (2013.01); *B60C 2011/0369* (2013.01); *B60C 2011/0381* (2013.01)

(56) References Cited

U.S. PATENT DOCUMENTS

2013/0133797 A1\* 5/2013 Takagi .................. B60C 11/033
　　　　　　　　　　　　　　　　　　　152/209.8
2016/0185159 A1\* 6/2016 Ookawa ................ B60C 11/125
　　　　　　　　　　　　　　　　　　　152/209.18

FOREIGN PATENT DOCUMENTS

| EP | 3 260 308 A1 | 12/2017 |
| EP | 3 575 110 A1 | 12/2019 |
| EP | 3 693 187 A1 | 8/2020 |
| JP | 2002-347413 | \* 12/2002 |
| JP | 2013-151235 A | 8/2013 |
| JP | 2019-26204 | \* 2/2019 |

\* cited by examiner

TIRE

FIELD OF THE DISCLOSURE

The present disclosure related to a tyre.

DESCRIPTION OF THE RELATED ART

The following Patent document 1 discloses a pneumatic tyre having middle ribs formed between center-side circumferential grooves and shoulder-side circumferential grooves. Each of the middle ribs is provided with inclined grooves that are in communication with the shoulder-side circumferential groove and inclined sipes that are in communication with the inclined grooves and extend to the center-side circumferential groove.

PATENT DOCUMENT

[Patent document 1] Japanese Unexamined Patent Application Publication 2013-151235

SUMMARY OF THE DISCLOSURE

Unfortunately, the above-mentioned pneumatic tyre disclosed in Patent document 1 has room for consideration to improve driving performance on low μ roads such as iron plate roads with a small friction coefficient and snow roads, and to improve wear resistance in a well-balanced manner.

The present invention has been made in view of the above circumstances and has an object to improve driving performance on low μ roads and wear resistance in a well-balanced manner.

In one aspect of the disclosure, a tyre includes a tread portion being provided with at least one longitudinal groove extending in a tyre circumferential direction and at least one land portion being adjacent to the at least one longitudinal groove, the at least one land portion having a ground contact surface defined between a first circumferential edge located on the at least one longitudinal groove side and a second circumferential edge located on an opposite side to the first circumferential edge, the at least one land portion being provided with first lateral grooves and sipes, the first lateral grooves extending in a tyre axial direction from the first circumferential edge and having inner ends thereof terminating within the at least one land portion, the first lateral grooves being provided with tie-bars on the respective inner ends side, the tie-bars having lengths smaller than lengths of the respective first lateral grooves, and the sipes including first sipe elements extending form the second circumferential edge to the respective first lateral grooves and second sipe elements extending on the respective tie-bars.

In another aspect of the disclosure, the first sipe elements may be connected to the respective second sipe elements.

In another aspect of the disclosure, the first sipe elements and the second sipe elements may be inclined in a same direction with respect to the tyre axial direction.

In another aspect of the disclosure, each of the first sipe elements may be connected to a respective one of the second sipe elements to form a single straight sipe.

In another aspect of the disclosure, the first sipe elements and the second sipe elements may have a same depth.

In another aspect of the disclosure, depths of the first lateral grooves may be in a range of 20% to 60% of a depth of the at least one longitudinal groove.

In another aspect of the disclosure, lengths in the tyre axial direction of the first lateral grooves may be in a range of 20% to 70% of a length in the tyre axial direction of the at least one land portion.

In another aspect of the disclosure, lengths in the tyre axial direction of the first sipe elements may be in a range of 20% to 80% of a length in the tyre axial direction of the at least one land portion.

In another aspect of the disclosure, each of the first lateral grooves may include a pair of groove sidewalls extending inwardly in a tyre radial direction from the ground contact surface of the at least one land portion, the pair of groove sidewalls may include a pair of first portions located on the inner end side of each of the first lateral grooves, and in a cross-sectional view of each of the first lateral grooves, the pair of first portions may be connected to the second sipe element directly.

In another aspect of the disclosure, the pair of first portions, in a cross-sectional view of each of the first lateral grooves, may extend in a straight shape over its entire length.

In another aspect of the disclosure, the pair of first portions, in a cross-sectional view of each of the first lateral grooves, may extend in a circular arc shape over its entire length.

In another aspect of the disclosure, the at least one land portion may be further provided with one or more closed sipes that have both ends terminating within the at least one land portion.

In another aspect of the disclosure, the at least one longitudinal groove may extend in a zigzag shape in the tyre circumferential direction.

In another aspect of the disclosure, the at least one longitudinal groove may have zigzag pitches, and the sipes may be arranged in the tyre circumferential direction at sipe pitches that are smaller than the zigzag pitches.

In another aspect of the disclosure, the at least one land portion may be provided with second lateral grooves extending in the tyre axial direction from the second circumferential edge and having inner ends thereof terminating within the at least one land portion.

In another aspect of the disclosure, a length in the tyre circumferential direction between directly adjacent one of the first lateral grooves and one of the second lateral grooves may be in a range of 30% to 70% of the zigzag pitches of the at least one longitudinal groove.

In another aspect of the disclosure, the at least one longitudinal groove may include a shoulder longitudinal groove and crown longitudinal groove arranged inwardly in the tyre axial direction of the shoulder longitudinal groove, and the at least one land portion may include a crown land portion formed between the shoulder longitudinal groove and the crown longitudinal groove.

In another aspect of the disclosure, the tread portion may further include a shoulder land portion adjacent to the crown land portion in the tyre axial direction through the shoulder longitudinal groove, the shoulder land portion may be provided with shoulder lateral grooves that traverse the shoulder land portion completely in the tyre axial direction, and groove depths of the shoulder lateral grooves may be in a range of 30% to 70% of a groove depth of the shoulder longitudinal groove.

In another aspect of the disclosure, in a plan view of the tread portion, each of the shoulder land portion and the crown land portion may include one or more protrusions protruding in the tyre axial direction, and the protrusions may have a circular arc shape having a radius of curvature equal to or more than 2 mm.

DESCRIPTION OF THE PREFERRED EMBODIMENTS

Figure 1:
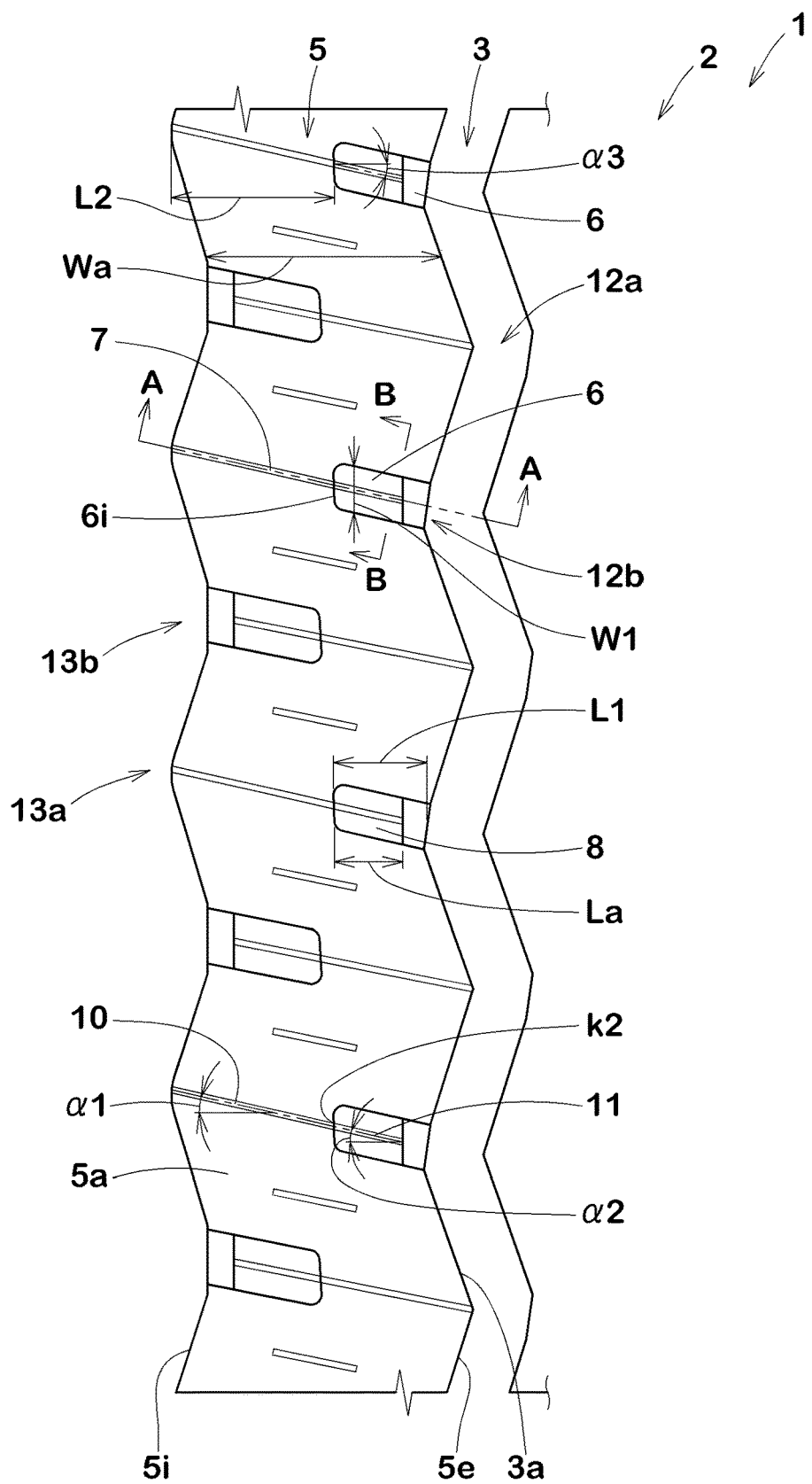
FIG. 1 is a partial enlarged development view of a tread portion according to an embodiment of the disclosure.

An embodiment of the present disclosure will be explained below with reference to the accompanying drawings.

Note that the same elements or parts are denoted by the same reference numerals throughout the embodiments below, and that redundant description of already described elements is omitted.

FIG. 1 is a partial enlarged development view of a tread portion 2 of a tyre 1 according to an embodiment of the disclosure.

As a preferred embodiment, FIG. 1 illustrates an all-season pneumatic tyre for light truck.

Note that the present disclosure can be embodied as various kinds of tyres. e.g., passenger car and heavy-duty vehicle tyres.

As illustrated in FIG. 1, the tread portion 2 according to the present embodiment includes at least one longitudinal groove 3 extending in the tyre circumferential direction and at least one land portion 5 located adjacent to the longitudinal groove 3.

The land portion 5, in the present embodiment, has a ground contact surface 5a defined between a first circumferential edge 5e located on the longitudinal groove 3 side and a second circumferential edge 5i located on an opposite side to the first circumferential edge 5e.

The first circumferential edge 5e, for example, is an edge formed between the ground contact surface 5a of the land portion 5 and a groove sidewall 3a of the longitudinal groove 3.

The land portion 5 is provided with first lateral grooves 6 and sipes 7. As used herein, the sipes mean incisions that have a width perpendicular to a longitudinal direction thereof being less than 1.5 mm. In contrast, grooves such as the longitudinal groove 3 and the first lateral grooves 6 have widths perpendicular to a longitudinal direction thereof being equal to or more than 1.5 mm, preferably more than 1.5 mm.

The first lateral grooves 6 extend in the tyre axial direction from the first circumferential edge 5e. The first lateral grooves 6 can generate snow-shearing force in cooperation with the longitudinal groove 3. The first lateral grooves 6 have respective inner ends 6i thereof terminating within the land portion 5. Thus, reduction in stiffness of the land portion 5 as well as reduction in ground contact area can be prevented, and wear resistance and driving performance on low μ roads may be improved.

The first lateral grooves 6 are provided with tie-bars 8 on the respective inner ends 6i sides, and the tie-bars have lengths La smaller than lengths L1 of the respective first lateral grooves 6. The tie-bars 8 are portions that are raised its groove bottoms shallower than the maximum depth of the respective first lateral grooves 6 and deeper than the ground contact surface 5a. The tie-bars 8 may enhance stiffness of the land portion 5 to improve wear resistance, while ensuring snow discharging property. As used herein, the lengths La and L1 of the tie-bars 8 and the first lateral grooves 6, respectively, mean lengths in the tyre axial direction.

The sipes 7 include first sipe elements 10 extending form the second circumferential edge 5i to the respective first lateral grooves 6, and second sipe elements 11 extending on the respective tie-bars 8. The first sipe elements 10 can scratch the ground by its sipe edges (edge effect), improving driving performance on low μ roads further. In addition, the second sipe elements 11 improve snow discharging property while softening stiffness of the land portion 5, improving driving performance on snow and wear resistance.

The longitudinal groove 3, in the present embodiment, extends in a zigzag shape in the tyre circumferential direction. The longitudinal groove 3 includes components in the tyre axial direction, generating snow-shearing force as well as scratching force on low μ roads. Note that the longitudinal groove 3 is not limited to a zigzag shape but can be modified to straight, wavy or arc shape, for example.

Preferably, the longitudinal groove 3 includes a pair of groove sidewalls 3a that are inclined at an angle 61 (shown in FIG. 2) in a range of 4 to 20 degrees with respect to a tread normal line n. Thus, the longitudinal groove 3 can discharge debris, e.g., stones or gravel, trapped in the longitudinal groove 3 easily, improving so called stone-biting resistance. The tread normal line n is a straight line perpendicular to the ground contact surface 5a passing a corner point k1 between one groove sidewall 3a and the ground contact surface 5a.

The first circumferential edge 5e and the second circumferential edge 5i, in the present embodiment, extend in a zigzag shape in the tyre circumferential direction. The first circumferential edge 5e, in the present embodiment, includes a plurality of first external corner portions 12a protruding outwardly in a width direction of the land portion 5 and a plurality of first internal corner portions 12b recessed inwardly in the width direction of the land portion 5. In the present embodiment, the first external corner portions 12a and the first internal corner portions 12b are arranged alternately in the tyre circumferential direction. The second circumferential edge 5i, in the present embodiment, includes a plurality of second external corner portions 13a protruding outwardly in the width direction of the land portion 5 and a plurality of second internal corner portions 13b recessed inwardly in the width direction of the land portion 5. In the present embodiment, the second external corner portions 13a and the second internal corner portions 13b are arranged alternately in the tyre circumferential direction.

The first sipe elements 10, in the present embodiment, are connected to the respective second sipe elements 11. Thus, the second sipe elements 11 can improve edge effect of the first sipe elements 10. Note that the sipes 7 are not limited to such an embodiment but can be modified to an embodiment such that the first sipe elements 10 are not connected to the second sipe elements 11, for example.

The first sipe elements 10, in the present embodiment, are inclined at an angle α1 in the same direction with respect to the tyre axial direction over its entire length. The second sipe elements 11, in the present embodiment, are inclined at an angle α2 in the same direction with respect to the tyre axial direction over its entire length. The first sipe elements 10, for example, are inclined in the same direction as the second sipe element 11 with respect to the tyre axial direction. Thus, such sipes 7 reduce stiffness difference at intersections k2 of the first sipe elements 10 and the second sipe elements 11, preventing uneven wear therearound.

In order to further improve the above effect, it is preferable that an absolute value of angle difference |α1−α2| between the angle α1 of the first sipe elements 10 with respect to the tyre axial direction and the angle α2 of the second sipe elements 11 with respect to the tyre axial direction is equal to or less than 20 degrees, more preferably equal to or less than 10 degrees, still further preferably equal to zero degrees.

In the present embodiment, each of the first sipe elements 10 is connected to a respective one of the second sipe elements 11 to form a single straight sipe. Thus, edge effect of each first sipe element 10 can be improved while preventing reduction in stiffness of the land portion 5, improving driving performance on low μ roads and wear resistance in a well-balanced manner. Note that the first sipe elements 10 and/or the second sipe elements 11 can extend in zigzag or wavy shape.

Each of the first sipe elements 10, for example, is connected to a center location in the tyre circumferential direction of a respective one of the first lateral grooves 6. Thus, each first sipe element 10 can maintain high stiffness of the land portion 5.

Each of the first sipe elements 10, in the present embodiment, is connected to a respective one of the second external corner portions 13a. Such first sipe elements 10, for example, can promote deformation of the first lateral grooves 6 to discharge snow held in the grooves effectively when large lateral force applies to the second external corner portions 13a during cornering.

Although it is not particularly limited, the angles α1 and α2 of the first sipe elements 10 and the second sipe elements 11, respectively, are preferably in a range of 10 to 30 degrees.

Although it is not particularly limited, lengths L2 in the tyre axial direction of the first sipe elements 10 are preferably equal to or more than 20%, more preferably equal to or more than 30%, further preferably equal to or more than 40% of a length Wa (the maximum length) in the tyre axial direction of the land portion 5. The lengths L2 in the tyre axial direction of the first sipe elements 10 are preferably equal to or less than 80%, more preferably equal to or less than 70%, further preferably equal to or less than 60% of the length Wa of the land portion 5.

Each of the second sipe elements 11, for example, extends from one end to the other end in the tyre axial direction of a respective one of the tie-bars 8. Thus, the second sipe elements 11 can further improve snow discharging property, improving driving performance on snow. Note that the second sipe elements 11 are not limited to the above embodiment, but can be modified to an embodiment such that the second sipe elements 11 terminate within the tie-bars 8, for example.

Figure 2:
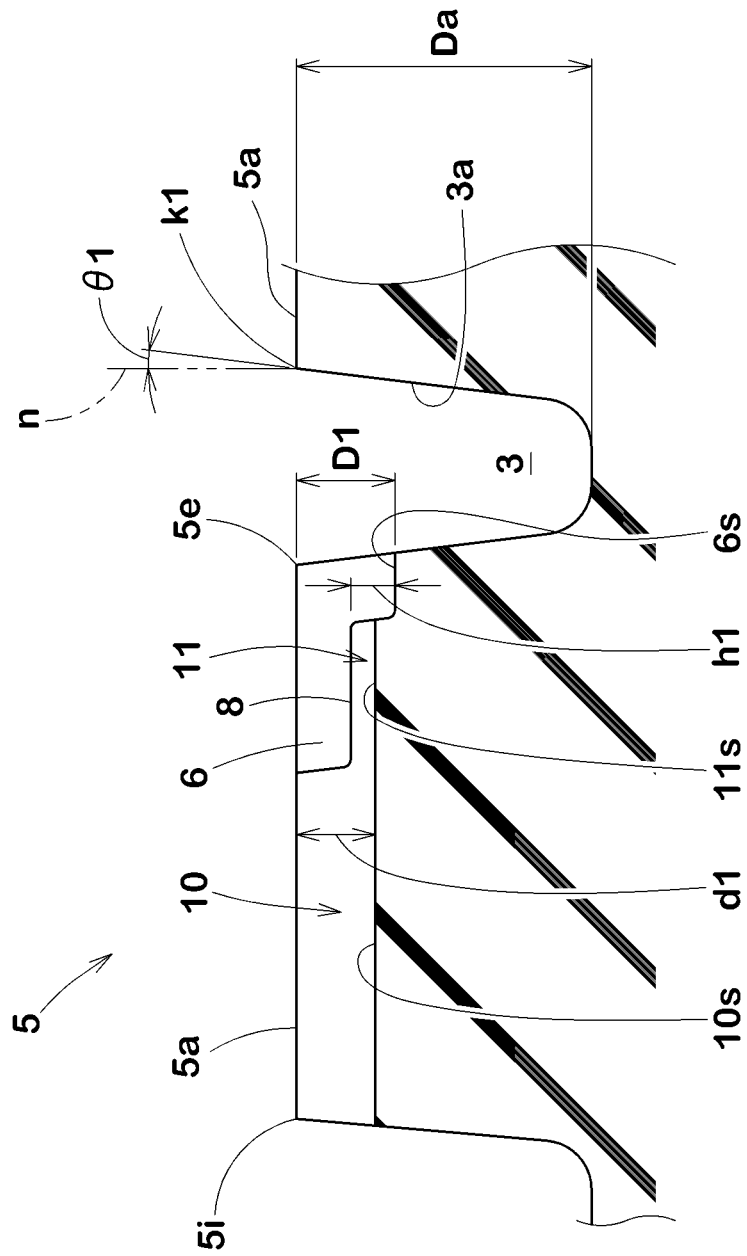
FIG. 2 is a cross-sectional view taken along line A-A of FIG. 1.

FIG. 2 is a cross-sectional view taken along line A-A of FIG. 1. As illustrated in FIG. 2, the first sipe elements 10 and the second sipe elements 11 have the same depth as with one another. As used herein, the "same depth" means that distances in the tyre radial direction from the ground contact surface 5a of the land portion 5 to sipe bottoms 10s and 11s of the first sipe elements 10 and the second sipe elements 11, respectively, are the same. Such sipes 7 can prevent reduction in stiffness of the land portion 5.

It is preferable that the depths dl of the first sipe elements 10 are in a range of from 50% to 85% of depths D1 of the first lateral grooves 6. When the depths dl of the first sipe elements 10 are equal to or more than 50% of the depths D1 of the first lateral grooves 6, scratching force on low μ roads can be increased. When the depths dl of the first sipe elements 10 are equal to or less than 85% of the depths D1 of the first lateral grooves 6, sufficient stiffness of the land portion 5 can be maintained.

As illustrated in FIG. 1, the first lateral grooves 6 are inclined at an angle α3 with respect to the tyre axial direction. Thus, the first lateral grooves 6 include components in the tyre circumferential direction, improving cornering performance on snow as well as driving performance on low μ roads.

The first lateral grooves 6, for example, are inclined in the same direction as the first sipe elements 10 with respect to the tyre axial direction. Such first lateral grooves 6 can improve edge effect of the first sipe element 10. An absolute value of an angle difference |α1−α3| between the angle α1 of the first sipe elements 10 with respect to the tyre axial direction and the angle α3 of the first lateral grooves 6 with respect to the tyre axial direction is equal to or less than 20 degrees, more preferably equal to or less than 10 degrees, still further preferably equal to zero degrees. In the present embodiment, the absolute value of an angle difference is zero degrees.

The first lateral grooves 6, for example, are connected to the respective first internal corner portions 12b. Such first lateral grooves 6 may improve wear resistance around the first internal corner portions 12b.

In the present embodiment, the depths D1 (shown in FIG. 2) of the first lateral grooves 6 are in a range of 20% to 60% of a depth Da of the longitudinal groove 3. When the depths D1 are equal to or more than 20% of the depth Da, driving performance on snow can be improved. When the depths D1 are equal to or less than 60% of the depth Da, high wear resistance can be maintained. The depth D1 of the first lateral grooves 6 are more preferably equal to or more than 30% of the depth Da of the longitudinal groove 3, but more preferably equal to or less than 50% of the depth Da of the longitudinal groove 3. The depth Da of the longitudinal groove 3, for example, is in a range of 10.0 to 15.0 mm.

It is preferable that the length L1 in the tyre axial direction of the first lateral grooves 6 are in a range of 20% to 70% of the length Wa in the tyre axial direction of the land portion 5. When the lengths L1 of the first lateral grooves 6 are equal to or more than 20% of the length Wa in the tyre axial direction of the land portion 5, driving performance on snow can be improved. When the lengths L1 of the first lateral grooves 6 are equal to or less than 70% of the length Wa in the tyre axial direction of the land portion 5, high wear resistance can be maintained. The lengths L1 of the first lateral grooves 6 are more preferably equal to or more than 30%, still further preferably equal to or more than 40% of the length Wa in the tyre axial direction of the land portion 5. Further, the lengths L1 of the first lateral grooves 6 are more preferably equal to or less than 60%, still further preferably equal to or less than 50% of the length Wa in the tyre axial direction of the land portion 5.

Although it is not particularly limited, groove widths W1 in the tyre circumferential direction of the first lateral grooves 6, for example, are preferably in a range of 10% to 20% of the length Wa in the tyre axial direction of the land portion 5.

The tie-bars 8, in the present embodiment, are connected to the respective inner ends 6i of the first lateral grooves 6. This structure may prevent the inner ends 6i of the first lateral grooves 6 from crack or chipping.

It is preferable that the lengths La of the tie-bars 8 are in a range of 60% to 90% of the respective lengths L1 of the first lateral grooves 6. Thus, driving performance on snow and wear resistance can be improved in a well-balanced manner.

It is preferable that protruding heights h1 of the tie-bars 8 (shown in FIG. 2) are in a range of 30% to 70% of the respective groove depths D1 of the first lateral grooves 6. When the protruding heights h1 of the maintained tie-bars 8 are equal to or more than 30% of the respective groove depths D1 of the first lateral grooves 6, high stiffness of the land portion 5 can be maintained to improve wear resistance. When the protruding heights h1 of the stiffness tie-bars 8 are equal to or less than 70% of the respective groove depths D1 of the first lateral grooves 6, the first lateral grooves 6 can generate powerful snow-shearing force, improving driving performance on snow. As used herein, the protruding height h1 of each tie-bar 8 is a length in the tyre radial direction between an upper surface in the tyre radial direction of the tie-bar 8 and a groove bottom (the deepest groove bottoms) 6s of a respective one of the first lateral grooves 6.

Figure 3A:
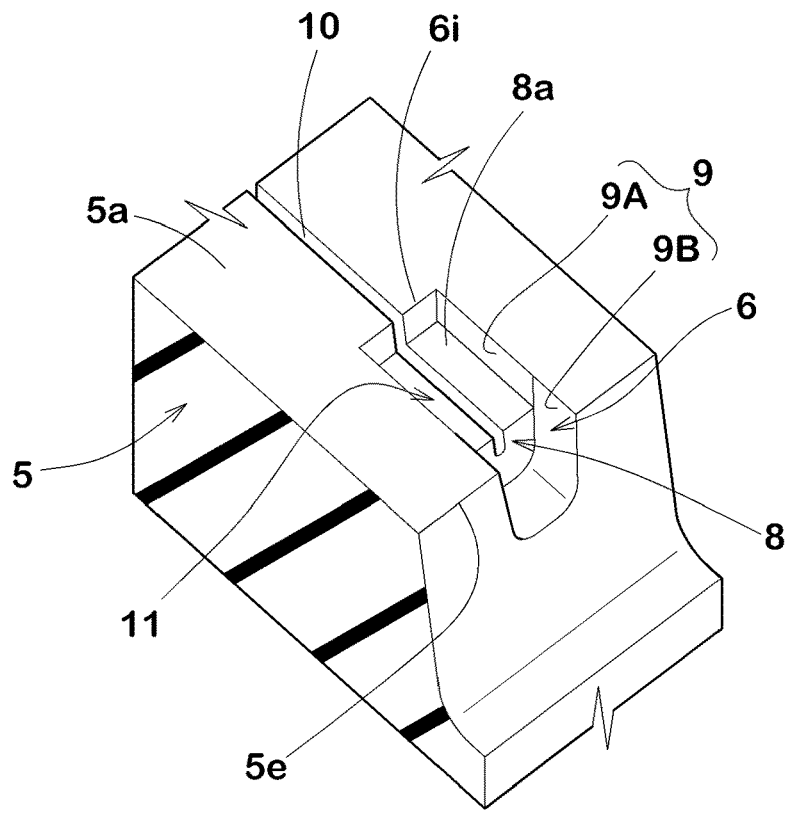
FIG. 3A is a perspective view of one first lateral groove.
Figure 3B:
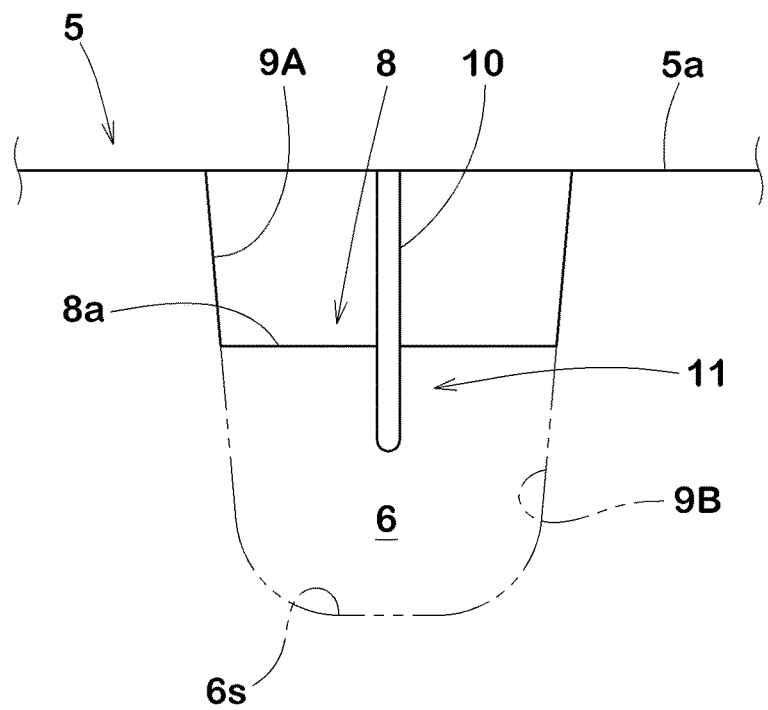
FIG. 3B is a cross-sectional view taken along line B-B of FIG. 1.

FIG. 3A is a perspective view of one of the first lateral grooves 6, and FIG. 3B is a cross-sectional view taken along line B-B of FIG. 1. As illustrated in FIG. 3A and FIG. 3B, each of the first lateral grooves 6 according to the present embodiment includes a pair of groove sidewalls 9 that extends inwardly in the tyre radial direction from the ground contact surface 5a of the land portion 5. The pair of groove sidewalls 9, for example, includes a pair of first portions 9A located on the inner end 6i side and a pair of second portions 9B located on the first circumferential edge 5e side with respect to the pair of first portions 9A. The pair of first portions 9A, for example, is arranged such that the second sipe element 11 is located therebetween. The pair of second portions 9B, for example, extends to the deepest groove bottom 6s, thus, the pair of second portions 9B has a larger length in the tyre radial direction than that of the pair of first portions 9A.

The pair of first portions 9A is connected to the upper surface 8a in the tyre radial direction of the tie-bar 8. The upper surface 8a, for example, extends in parallel with the ground contact surface 5a and is provided with the second sipe element 11. The pair of first portions 9A according to the present embodiment, in a cross-sectional view of the first lateral groove 6, overlaps the second portions 9B.

Figure 4:
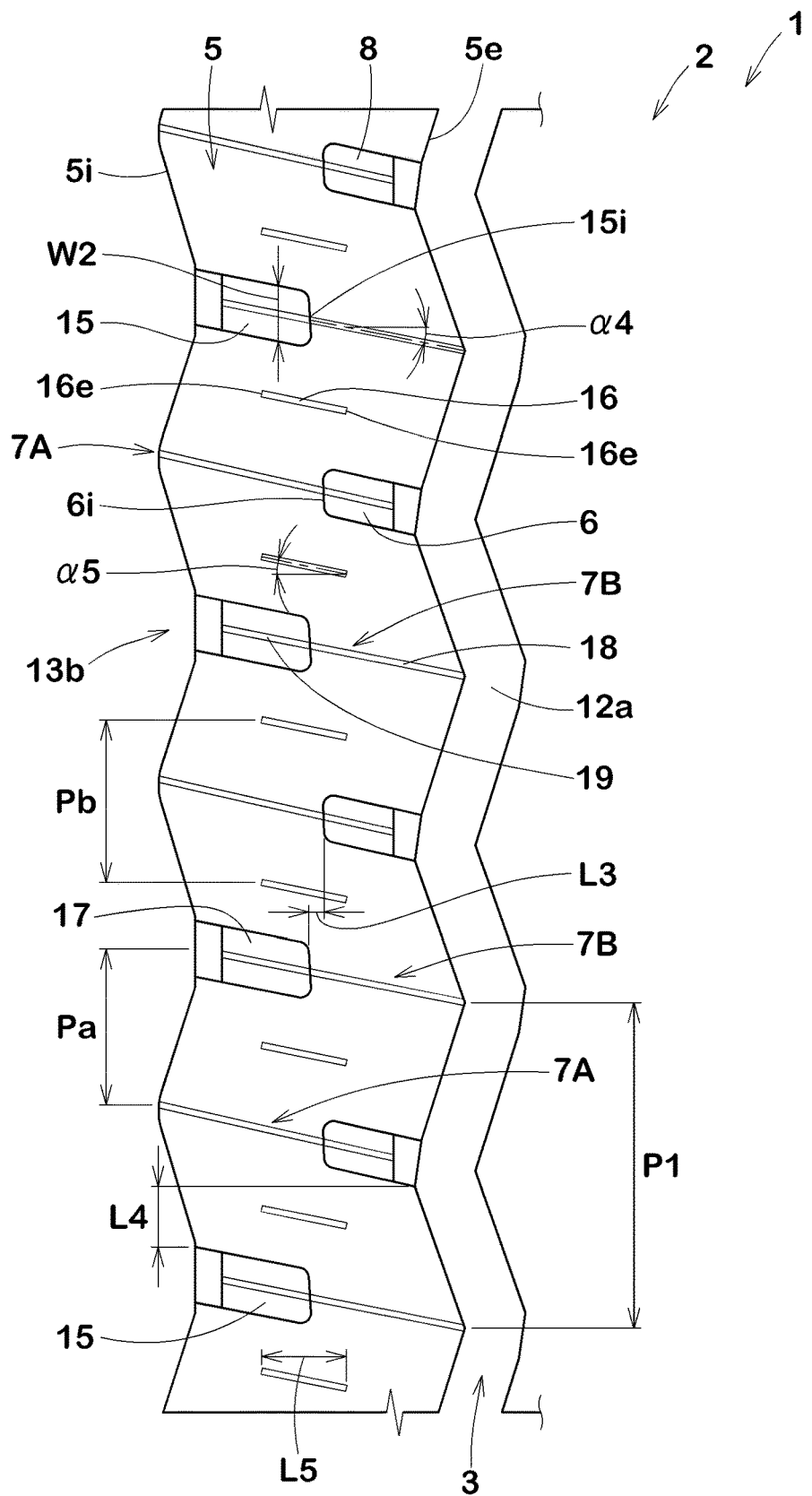
FIG. 4 is a partial enlarged development view of the tread portion according to an embodiment of the disclosure.

FIG. 4 is a partial enlarged development view of the tread portion 2 according to the embodiment of the disclosure. As illustrated in FIG. 4, the land portion 5, in the present embodiment, is further provided with a plurality of second lateral grooves 15 extending in the tyre axial direction from the second circumferential edge Si and having inner ends 15i terminating within the land portion 5. The second lateral grooves 15 can improve edge effect and snow-shearing force.

The second lateral grooves 15, for example, are connected to the respective second internal corner portions 13b. Such second lateral grooves 15 can be helpful to prevent uneven wear of the second internal corner portions 13b to which large load tends to apply upon driving.

The second lateral grooves 15 are provided with tie-bars 17 on the respective inner ends 15i side and the tie-bars 17 have lengths smaller than lengths of the respective second lateral grooves 15. The tie-bars 17 of the second lateral grooves 15 are configured to the same aspect as the tie-bars 8 of the first lateral grooves 6. Thus, the detail explanation for the tie-bars 17 of the second lateral grooves 15 is omitted. As used herein, the above-mentioned "same aspect" includes at least the lengths in the tyre axial direction, the depths, ratios thereof, and inclination direction.

Groove width W2 of the second lateral grooves 15, in the present embodiment, may be greater than the groove widths W1 of the first lateral grooves 6. Thus, the second lateral grooves 15 can generate greater snow-shearing force than the first lateral grooves 6. In order to improve driving performance on snow and wear resistance in a well-balanced manner, the groove widths W2 of the second lateral grooves 15 are preferably in a range of 1.1 to 1.4 times the groove widths W1 of the first lateral grooves 6.

The inner ends 15i of the second lateral grooves 15, in the present embodiment, are located on the second circumferential edge Si side with respect to the inner ends 6i of the first lateral grooves 6. In other words, on the land portion 5, the second lateral grooves 15 and the first lateral grooves 6 do not overlap in the tyre axial direction. Thus, the land portion 5 can maintain high stiffness, improving wear resistance. Although it is not particularly limited, a distance L3 in the tyre axial direction between the inner ends 15i of the second lateral grooves 15 and the inner ends 6i of the first lateral grooves 6 is preferably in a range of from 5% to 15% of the length Wa in the tyre axial direction of the land portion 5.

Preferably, a length L4 in the tyre circumferential direction between the first lateral grooves 6 and the second lateral grooves 15 is in a range of 30% to 70% of zigzag pitches P1 of the longitudinal groove 3. When the length L4 is equal to or more than 30% of the zigzag pitches P1, reduction in stiffness of the land portion 5 can be prevented. When the length L4 is equal to or less than 70% of the zigzag pitches P1, high edge effect as well as powerful snow-shearing force can be obtained.

The sipes 7, in the present embodiment, may include a plurality of primary sipes 7A and a plurality of secondary sipes 7B. The primary sipes 7A each includes a combination of one of the first sipe elements 10 and one of the second sipe elements 11 (shown in FIG. 1) which are adjacent in the tyre axial direction. The secondary sipes 7B include third sipe elements 18 and fourth sipe elements 19. The primary sipes 7A and the secondary sipes 7B, for example, are arranged alternately in the tyre circumferential direction. The third sipe elements 18, in the present embodiment, extend from the first circumferential edge 5e to the respective second lateral grooves 15. The fourth sipe elements 19, for example, extend on the tie-bars 17 of the respective second lateral grooves 15.

The third sipe elements 18 according to the embodiment are connected to the respective first external corner portions 12a. Such third sipe elements 18, for example, can promote deformation of the second lateral grooves 15 to discharge snow held in the grooves effectively when large lateral force applies to the first external corner portions 12a during cornering.

An absolute value of angle difference $|\alpha 1-\alpha 4|$ between the angles $\alpha 4$ of the third sipe elements 18 with respect to the tyre axial direction and the angles $\alpha 1$ of the first sipe elements 10 (shown in FIG. 1) is preferably equal to or less than 20 degrees, more preferably equal to or less than 10 degrees, in the present embodiment, the absolute value of angle difference |α1-α4| is zero degrees.

The third sipe elements 18, in the present embodiment, are formed in the same manner as the first sipe elements 10. The fourth sipe elements 19, for example, are formed in the same manner as the second sipe elements 11.

In the present embodiment, the sipes 7 are arranged in the tyre circumferential direction at sipe pitches Pa that are smaller than the zigzag pitches P1. Thus, edge effect of the sipes 7 can be improved. In the present embodiment, in every one zigzag pitch P1 of the longitudinal groove 3, two sipes of one primary sipe 7A and one secondary sipe 7B are provided.

The land portion 5 according to the present embodiment is further provided with one or more closed sipes 16 that have both ends 16e terminating within the land portion 5. The closed sipes 16, for example, are spaced in the tyre circumferential direction. One closed sipe 16, in the present embodiment, is arranged between the adjacent primary sipes 7A and the secondary sipe 7B. In the present embodiment, pitches Pb in the tyre circumferential direction of the closed sipes 16 are smaller than the zigzag pitches P1 of the longitudinal groove 3.

It is preferable that lengths L5 in the tyre axial direction of the closed sipes 16 are in a range of from 20% to 40% of the length Wa (shown in FIG. 1) in the tyre axial direction of the land portion 5. When the lengths L5 of the closed sipes 16 are equal to or more than 20% of the length Wa of the land portion 5, driving performance on low μ roads can be improved. When the lengths L5 of the closed sipes 16 are equal to or less than 40% of the length Wa of the land portion 5, high wear resistance can be maintained.

The closed sipes 16, for example, are inclined at angles α5 with respect to the tyre axial direction. The closed sipes 16, in the present embodiment, are inclined in the same direction as the sipes 7 with respect to the tyre axial direction. As absolute value of angle difference |α1-α5| between the angle α5 of the closed sipes 16 with respect to the tyre axial direction and the angles α1 of the first sipe elements 10 is preferably equal to or less than 20 degrees, more preferably equal to or less than 10 degrees. In the present embodiment, the absolute value of angle difference |α1-α5| is zero degrees. The closed sipes 16, for example, extend in a straight shape over its entire length.

Figure 5:
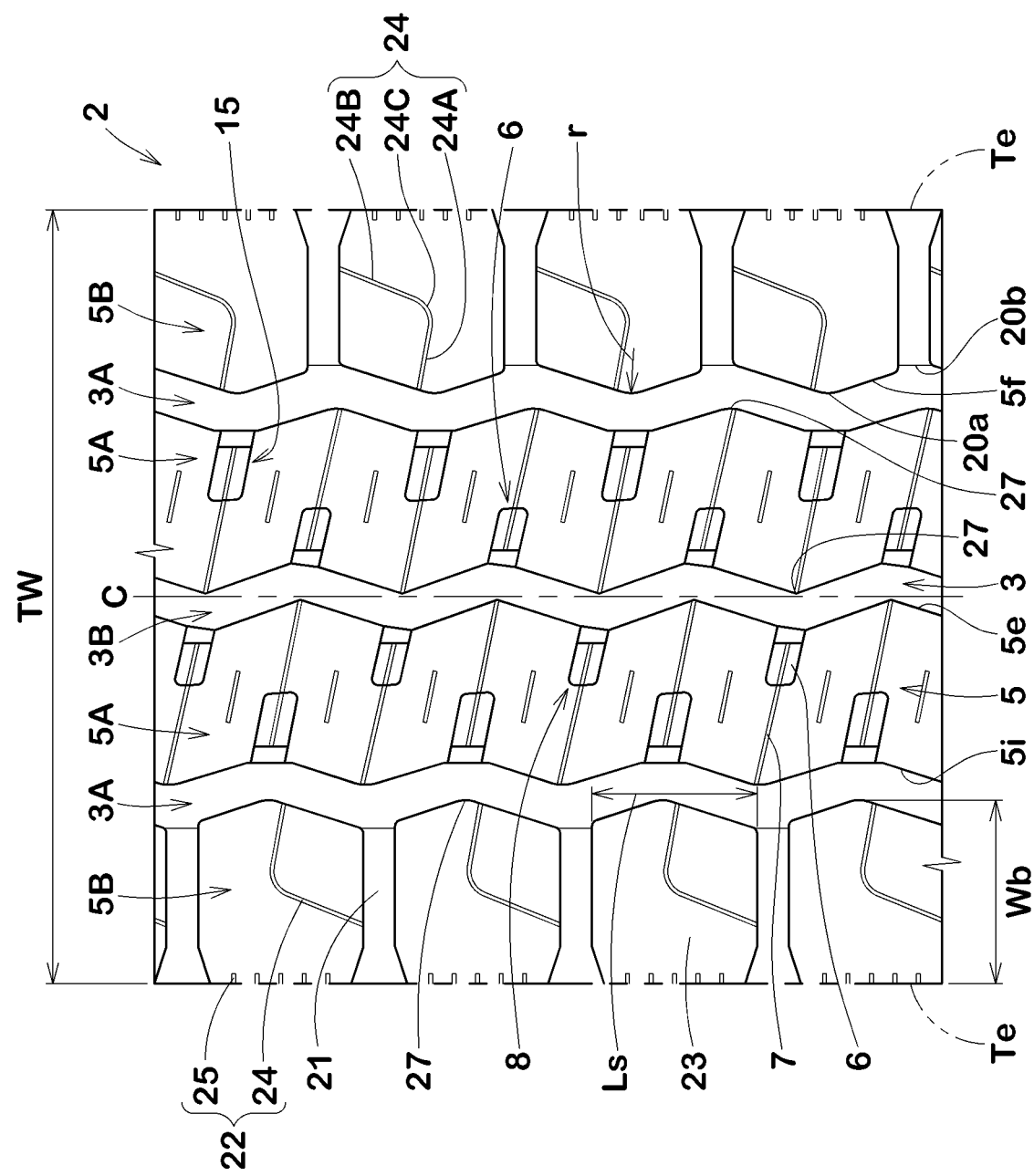
FIG. 5 is an entire development view of the tread portion.

FIG. 5 is an entire development view of the tread portion 2. As illustrated in FIG. 5, the at least one longitudinal groove 3 according to the present embodiment may include two shoulder longitudinal grooves 3A and one crown longitudinal groove 3B located inwardly in the tyre axial direction with respect to the shoulder longitudinal grooves 3A. The shoulder longitudinal grooves 3A, in the present embodiment, extend in the tyre circumferential direction continuously and are located adjacent to respective tread edges Te. The crown longitudinal groove 3B according to the present embodiment extends in the tyre circumferential direction continuously and is located on the tyre equator C.

As used herein, the "tread edges Te" are the axial outermost edges of the ground contacting patch of the tyre 1 which occurs under a normal condition with a standard tyre load when the camber angle of the tyre is zero. As used herein, the axial distance between the tread edges Te is defined as a tread width TW of the tyre.

As used herein, the "normal condition" is such that the tyre 1 is mounted onto a standard wheel rim (not illustrated) with a standard pressure but loaded with no tyre load. Unless otherwise noted, dimensions of respective portions of the tyre 1 are values measured under the normal condition.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The "standard tyre load" is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

In the present embodiment, the shoulder longitudinal grooves 3A and the crown longitudinal groove 3B extend in the tyre circumferential direction in a zigzag shape.

The at least one land portion 5, in the present embodiment, includes tow crown land portions 5A between the crown longitudinal groove 3B and the respective shoulder longitudinal grooves 3A, and two shoulder land portions 5B being adjacent to the respective crown land portions 5A in the tyre axial direction through the respective shoulder longitudinal grooves 3A. On either side of the tyre equator C, one crown land portion 5A and one shoulder land portion 5B are arranged, for example.

The first lateral grooves 6 and the sipes 7, in the present embodiment, are arranged on the crown land portions 5A. The crown land portions 5A tend to receive large ground contact pressure. By providing the crown land portions 5A with the first lateral grooves 6, the sipes 7 and the tie-bars 8, the effect that improves driving performance on snow/low μ roads and wear resistance in a well-balanced manner can further be achieved. Note that the first lateral grooves 6, the sipes 7 and the tie-bars 8 may be provided on the shoulder land portions 5B.

In the present embodiment, the first circumferential edge 5e of each crown land portion 5A is located on the crown longitudinal groove 3B side, and the second circumferential edge 5i is located on the respective shoulder longitudinal grooves 3A sides. In each crown land portion 5A according to the present embodiment, the first lateral grooves 6 that have relatively small groove widths are arranged on the tyre equator C side that receives large ground contact pressure, and the second lateral grooves 15 that have relatively large groove widths are arranged on the respective tread edges Te sides. Thus, driving performance on snow and wear resistance can be improved in a well-balanced manner.

The shoulder land portions 5B, in the present embodiment, each include a third circumferential edge 5f on a respective shoulder longitudinal groove 3A side. The third circumferential edge 5f, in the present embodiment, extends in the tyre circumferential direction in a zigzag shape. The third circumferential edge 5f, for example, includes a plurality of third external corners 20a protruding toward the tyre equator C. and a plurality of third internal corners 20b recessed toward a respective one of the tread edges Te.

The shoulder land portions 5B, in the present embodiment, are provided with a plurality of shoulder lateral grooves 21 and a plurality of shoulder sipes 22. The shoulder lateral grooves 21 and the shoulder sipes 22, for example, are arranged in the tyre circumferential direction.

The shoulder lateral grooves 21, for example, connect the shoulder longitudinal grooves 3A to the respective tread edges Te so as to traverse the shoulder land portions 5B. Thus, the shoulder land portions 5B are divided into shoulder blocks 23 arranged in the tyre circumferential direction. The shoulder lateral grooves 21, for example, are connected to the respective third internal corners 20b.

It is preferable that groove depths (not illustrated) of the shoulder lateral grooves 21 are in a range of 30% to 70% of depths of the shoulder longitudinal grooves 3A. When the groove depths of the shoulder lateral grooves 21 are equal to or more than 30% of the groove depths of the shoulder longitudinal grooves 3A, driving performance on snow can be improved. When the groove depths of the shoulder lateral grooves 21 are equal to or less than 70% of the groove depths of the shoulder longitudinal grooves 3A, high wear resistance of the shoulder land portions 5B can be maintained. Preferably, the groove depths of the shoulder longitudinal grooves 3A are in a range of 3.0 to 10.0 mm.

The shoulder sipes 22, in the present embodiment, include a plurality of shoulder first sipes 24 extending from the shoulder longitudinal grooves 3A, and a plurality of shoulder second sipes 25 extending from the tread edges Te.

The shoulder first sipes 24, for example, are provided with the shoulder blocks 23. In each shoulder block 23, at least one, one in the present embodiment, shoulder first sipe 24 is provided.

The shoulder first sipes 24 according to the present embodiment extend in such a way as to connect the shoulder longitudinal grooves 3A to the shoulder lateral grooves 21. Each of the shoulder first sipes 24, in the present embodiment, includes an axial portion 24A, a circumferential portion 24B, and a circular arc portion 24C to form a V-shape. The axial portion 24A, for example, extends in the tyre axial direction from one of the shoulder longitudinal grooves 3A. The circumferential portion 24B, for example, extends in the tyre circumferential direction from one of the shoulder lateral grooves 21. The circular arc portion 24C, for example, extends in an arc shape manner to connect to the axial portion 24A to the circumferential portion 24B.

The plurality of shoulder second sipes 25, for example, are provided on each shoulder block 23. The shoulder second sipes 25 have smaller length in the tyre axial direction than that of the shoulder first sipes 24. The shoulder second sipes 25 may be useful to prevent uneven wear of the tread edges Te.

The crown land portions 5A and the shoulder land portions 5B include protrusions 27 protruding outwardly in a width direction of a respective one of the land portions. Each of the protrusions 27 has a circular arc shape having a radius of curvature (r) equal to or more than 2 mm. Such protrusions 27 can prevent uneven wear and chipping of the land portions 5. When the radius of curvature (r) of the protrusions 27 becomes too large, shearing force on snow may be small. Thus, the radius of curvature (r) is preferably equal to or less than 5 mm. The protrusions 27, in the present embodiment, are formed on the first external corner portions 12a and the second external corner portions 13a (shown in FIG. 1) of the crown land portions 5A, and the third external corners 20a of the shoulder land portions 5B.

Although it is not limited, the length Wa (shown in FIG. 1) in the tyre axial direction of each of the crown land portions 5A is preferably in a range of 30% to 90% of a length Wb (the maximum length) in the tyre axial direction of each of the shoulder land portions 5B. The zigzag pitches P1 of the crown longitudinal grooves 3B are preferably in a range of 80% to 120% of lengths Ls in the tyre circumferential direction of the shoulder blocks 23. Thus, driving performance on snow and wear resistance can be improved in a well-balanced manner.

In each of the shoulder land portions 5B, a land ratio is preferably in a range of 70% to 90%. The land ratio is a ratio Sb/Sa of an area Sb of an actual total ground contact surface of the shoulder land portion 5B to an area Sa of a virtual total ground contact surface of the shoulder land portion 5B defined by filling all shoulder sipes 22 and the shoulder lateral grooves 21 up.

Figure 6A:
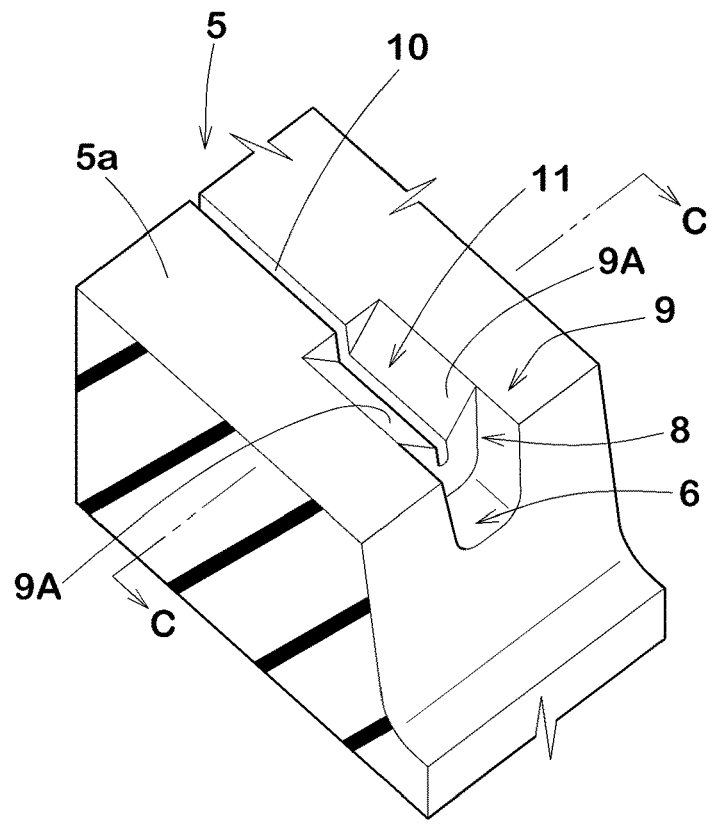
FIG. 6A is a perspective view of one first lateral groove according to another embodiment.
Figure 6B:
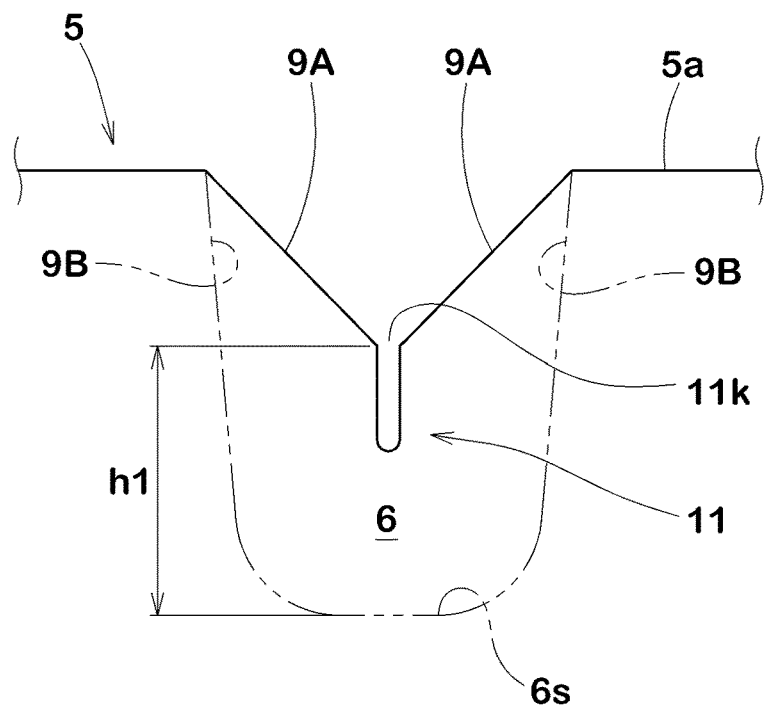
FIG. 6B is a cross-sectional view taken along line C-C of FIG. 6A.

FIG. 6A is a perspective view of one first lateral groove 6 according to another embodiment, and FIG. 6B is a cross-sectional view taken along line C-C of FIG. 6A. As illustrated in FIG. 6A and FIG. 6B, in at least one first lateral groove 6, the pair of first portions 9A of the groove sidewalls 9 may be connected to the second sipe element 11 directly. Thus, this structure can enhance stiffness of a portion of the first lateral groove 6, improving wear resistance.

In a cross-sectional view of the first lateral groove 6, the pair of first portions 9A, for example, extends in a straight shape. Such a pair of first portions 9A can improve stone-biting resistance while preventing driving performance on snow. Note that the above-mentioned "straight shape" includes an aspect that the pair of first portions 9A extends in a straight shape over its entire length as well as an aspect that a chamfer portion is provided on a corner between the pair of first portions 9A and the ground contact surface 5a, and on a corner portion between the pair of first portions 9A and the second sipe element 11. Such a chamfer portion may be helpful to prevent reduction in stiffness of the corner portions.

In a perspective cross-sectional view of the first lateral groove 6, the pair of first portions 9A according to this embodiment does not overlap the second portions 9B as shown in FIG. 6B. In this embodiment, the protruding heights h1 of the tie-bar 8 is defined as a length in the tyre radial direction from the groove bottom 6s to an opening end Ilk of the second sipe element 11.

Figure 7A:
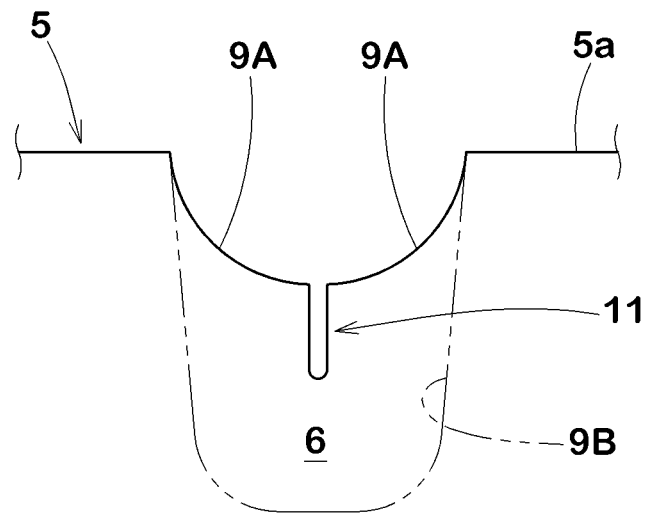
FIG. 7A is a cross-sectional view of one first lateral groove according to another embodiment.

FIG. 7A is a cross-sectional view of one first lateral groove 6 according to yet another embodiment. As illustrated in FIG. 7A, the pair of first portions 9A, in a cross-sectional view of the first lateral grooves 6, extends in a circular arc shape over its entire length. In this embodiment, the pair of first portions 9A is formed into a circular arc shape that is concave inwardly in the tyre radial direction. Such a pair of first portions 9A can improve snow-shearing force and driving performance on low s roads.

Figure 7B:
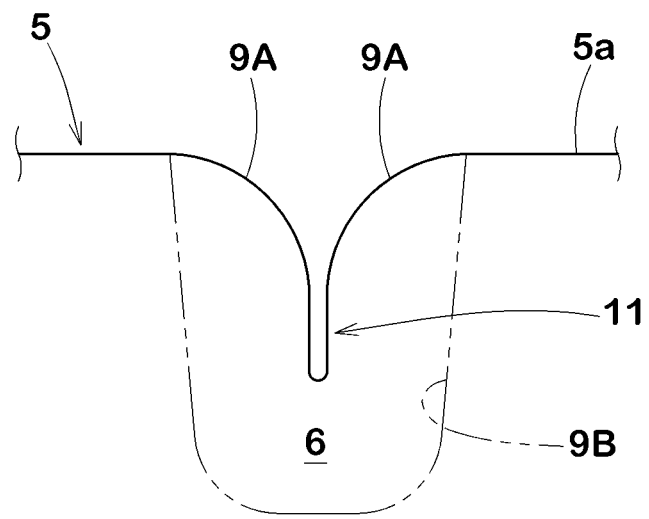
FIG. 7B is a cross-sectional view of one first lateral groove according to yet another embodiment.

FIG. 7B is a cross-sectional view of one first lateral groove 6 according to still further embodiment. As illustrated in FIG. 7B, in this embodiment, the pair of first portions 9A is formed into a circular arc shape that is convex outwardly in the tyre radial direction. Such a pair of first portions 9A can enhance stiffness of the land portion 5 so as to form a hard snow column, improving wear resistance while preventing reduction in driving performance on snow.

While the particularly preferred embodiments in accordance with the disclosure have been described in detail above, the present disclosure is not limited to the above embodiments but can be modified and carried out in various aspects within the scope of the disclosure.

Example

Tires having a basic pattern of FIG. 5 were prototyped based on the specification shown in Tables 1 and 2. Then, driving performance on snow and low μ roads, stone-biting resistance and wear resistance of each test tyre was tested. The common specification of the tyres and test procedures are as follows.

Tyre size: 205/85R16 117/115L
Rim size: 16×5.5J
Inner pressure: 600 kPa

Driving Performance Test:

The test tyres were installed on all wheels of a 3000 cc light truck. Then, a test driver drove the above vehicle on an iron plate road and a snowy road with zero load (no load), and then traction performance, braking performance and stability were evaluated by the sensory function of the test driver on each road surface. The test results are shown in Tables 1 and 2 as a score with Example 1 as 100, and the larger the value, the better the driving performance on each road surface.

Stone-Biting Resistance Test:

A test driver drove the above vehicle loaded with a load of 3 tons for 100 km on a gravel road test course. The state of each longitudinal groove and lateral groove in the rear wheel (driving wheel) tyre was confirmed by the naked eye of a tester. The results were evaluated based on the occurrence of stone-biting, and are shown in Tables 1 and 2 as a score with Example 1 set to 100. The larger the number, the smaller the stone-biting and the better.

Wear Resistance Test:

A test driver drove the above vehicle on a dry asphalt road. Then, the degree of wear of the crown land portion and the occurrence of uneven wear were evaluated by sensory function of the test driver. The results are shown as a score with Example 1 set to 100. The larger the value, the more the wear and uneven wear are suppressed, and the better the wear resistance.

Mileage: 20000 km

The test results are shown in Tables 1 and 2.

TABLE 1

|  | Ref. 1 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Second sipe elements | none | presence | presence | presence | presence | presence | presence | presence | presence |
| Wa/Wb (%) | 60 | 70 | 30 | 90 | 60 | 60 | 60 | 60 | 60 |
| L1/Wa (%), L2/Wa (%) | 45 | 45 | 45 | 45 | 45 | 20 | 70 | 45 | 45 |
| P1/Ls (%) | 100 | 100 | 100 | 100 | 100 | 100 | 100 | 80 | 120 |
| D1/Da (%) | 50 | 50 | 50 | 50 | 50 | 50 | 50 | 50 | 50 |
| r (mm) | 2 | 2 | 2 | 2 | 2 | 2 | 2 | 2 | 2 |
| Longitudinal groove shape | zigzag | zigzag | zigzag | zigzag | zigzag | zigzag | zigzag | zigzag | zigzag |
| Number of closed sipe(s) per shoulder block | 1 | 1 | 1 | 1 | 1 | 1 | 1 | 1 | 1 |
| Number of first shoulder sipe(s) per shoulder block | 1 | 1 | 1 | 1 | 1 | 1 | 1 | 1 | 1 |
| Sb/Sa (%) | 80 | 80 | 80 | 80 | 80 | 80 | 80 | 80 | 80 |
| First lateral groove shape | FIG. 3A | FIG. 3A | FIG. 3A | FIG. 3A | FIG. 3A | FIG. 3A | FIG. 3A | FIG. 3A | FIG. 3A |
| Driving performance on snow [score] | 85 | 100 | 95 | 105 | 100 | 95 | 105 | 100 | 100 |
| Driving performance on low μ road [score] | 90 | 100 | 95 | 105 | 95 | 105 | 95 | 100 | 100 |
| Stone-biting resistance [score] | 100 | 100 | 100 | 100 | 100 | 100 | 100 | 100 | 100 |
| Wear resistance (state of wear) [score] | 100 | 100 | 105 | 95 | 105 | 105 | 95 | 100 | 100 |
| Wear resistance (degree of uneven wear) | 100 | 100 | 100 | 95 | 100 | 95 | 105 | 100 | 100 |

TABLE 2

|  | Ex. 9 | Ex. 10 | Ex. 11 | Ex. 12 | Ex. 13 | Ex. 14 | Ex. 15 | Ex. 16 | Ex. 17 | Ex. 18 |
| --- | --- | --- | --- | --- | --- | --- | --- | --- | --- | --- |
| Second sipe elements | presence | presence | presence | presence | presence | presence | presence | presence | presence | presence |
| Wa/Wb (%) | 60 | 60 | 60 | 60 | 60 | 60 | 60 | 60 | 60 | 60 |
| L1/Wa (%), L2/Wa (%) | 45 | 45 | 45 | 45 | 45 | 45 | 45 | 45 | 45 | 45 |
| P1/Ls (%) | 100 | 100 | 100 | 100 | 100 | 100 | 100 | 100 | 100 | 100 |
| D1/Da (%) | 70 | 50 | 50 | 50 | 50 | 50 | 50 | 50 | 50 | 50 |
| r (mm) | 2 | 0 | 2 | 2 | 2 | 2 | 2 | 2 | 2 | 2 |
| Longitudinal groove shape | zigzag | zigzag | straight | zigzag | zigzag | zigzag | zigzag | zigzag | zigzag | zigzag |
| Number of closed sipe(s) per shoulder block | 1 | 1 | 1 | 0 | 1 | 1 | 1 | 1 | 1 | 1 |
| Niunber of first shoulder sipe(s) per shoulder block | 1 | 1 | 1 | 1 | 0 | 1 | 1 | 1 | 1 | 1 |
| Sb/Sa (%) | 80 | 80 | 80 | 80 | 80 | 70 | 90 | 80 | 80 | 80 |
| First lateral groove shape | FIG. 3A | FIG. 3A | FIG. 3A | FIG. 3A | FIG. 3A | FIG. 3A | FIG. 3A | FIG. 6A | FIG. 7A | FIG. 7B |
| Driving performance on snow [score] | 105 | 105 | 90 | 100 | 100 | 105 | 95 | 95 | 100 | 95 |
| Driving performance on low μ road [score] | 100 | 105 | 100 | 95 | 95 | 105 | 95 | 95 | 100 | 100 |
| Stone-biting resistance [score] | 100 | 100 | 105 | 100 | 100 | 100 | 100 | 100 | 102 | 98 |
| Wear resistance (state of wear) [score] | 95 | 95 | 100 | 100 | 100 | 95 | 105 | 105 | 98 | 102 |
| Wear resistance (degree of uneven wear) | 100 | 95 | 105 | 105 | 105 | 95 | 105 | 105 | 100 | 105 |

The tyres of the examples have improved driving performance on low μ roads and snow, and wear resistance in a well-balanced manner compared to the comparative example tyre. Further, the tyres of the examples have maintained high stone-biting resistance.

What is claimed is:

1. A tyre comprising:
a tread portion being provided with at least one longitudinal groove extending in a tyre circumferential direction and at least one land portion being adjacent to the at least one longitudinal groove,
the at least one land portion having a ground contact surface defined between a first circumferential edge located on one side of the at least one land portion on the at least one longitudinal groove side and a second circumferential edge located on an opposite side to the first circumferential edge,
the at least one land portion being provided with first lateral grooves and sipes,
the first lateral grooves extending in a tyre axial direction from the first circumferential edge and having inner ends thereof terminating within the at least one land portion,
the first lateral grooves being provided with tie-bars on the respective inner ends side, the tie-bars having lengths smaller than lengths of the respective first lateral grooves, and
the sipes comprising first sipe elements extending from the second circumferential edge to the respective first lateral grooves and second sipe elements extending on the respective tie-bars,
wherein
each of the first lateral grooves comprises a pair of groove sidewalls extending inwardly in a tyre radial direction from the ground contact surface of the at least one land portion,
the pair of groove sidewalls comprises a pair of first portions located on the inner end side of each of the first lateral grooves,
in a cross-sectional view of each of the first lateral grooves, the pair of first portions extends from the ground contact surface and is connected to the second sipe element directly, and
the pair of first portions, in a cross-sectional view of each of the first lateral grooves, extends in a straight shape over its entire length.

2. The tyre according to claim 1, wherein the first sipe elements are connected to the respective second sipe elements.

3. The tyre according to claim 2, wherein the first sipe elements and the second sipe elements are inclined in a same direction with respect to the tyre axial direction.

4. The tyre according to claim 1, wherein each of the first sipe elements is connected to a respective one of the second sipe elements to form a single straight sipe.

5. The tyre according to claim 1, wherein the first sipe elements and the second sipe elements have a same depth.

6. The tyre according to claim 1, wherein depths of the first lateral grooves are in a range of 20% to 60% of a depth of the at least one longitudinal groove.

7. The tyre according to claim 1, wherein lengths in the tyre axial direction of the first lateral grooves are in a range of 20% to 70% of a length in the tyre axial direction of the at least one land portion.

8. The tyre according to claim 1, wherein lengths in the tyre axial direction of the first sipe elements are in a range of 20% to 80% of a length in the tyre axial direction of the at least one land portion.

9. The tyre according to claim 1, wherein the at least one land portion is further provided with one or more closed sipes that have both ends terminating within the at least one land portion.

10. The tyre according to claim 1, wherein the at least one longitudinal groove extends in a zigzag shape in the tyre circumferential direction.

11. The tyre according to claim 10, wherein
the at least one longitudinal groove has zigzag pitches, and
the sipes are arranged in the tyre circumferential direction at sipe pitches that are smaller than the zigzag pitches.

12. The tyre according to claim 11, wherein the at least one land portion is provided with second lateral grooves extending in the tyre axial direction from the second circumferential edge and having inner ends thereof terminating within the at least one land portion.

13. The tyre according to claim 12, wherein a length in the tyre circumferential direction between directly adjacent one of the first lateral grooves and one of the second lateral grooves is in a range of 30% to 70% of the zigzag pitches of the at least one longitudinal groove.

14. The tyre according to claim 1, wherein
the at least one longitudinal groove comprises a shoulder longitudinal groove and crown longitudinal groove arranged inwardly in the tyre axial direction of the shoulder longitudinal groove, and
the at least one land portion comprises a crown land portion formed between the shoulder longitudinal groove and the crown longitudinal groove.

15. The tyre according to claim 14, wherein
the tread portion further comprises a shoulder land portion adjacent to the crown land portion in the tyre axial direction through the shoulder longitudinal groove,
the shoulder land portion is provided with shoulder lateral grooves that traverse the shoulder land portion completely in the tyre axial direction, and
groove depths of the shoulder lateral grooves are in a range of 30% to 70% of a groove depth of the shoulder longitudinal groove.

16. The tyre according to claim 15, wherein
in a plan view of the tread portion, each of the shoulder land portion and the crown land portion comprises one or more protrusions protruding in the tyre axial direction, and
the protrusions have a circular arc shape having a radius of curvature equal to or more than 2 mm.

17. A tyre comprising:
a tread portion being provided with at least one longitudinal groove extending in a tyre circumferential direction and at least one land portion being adjacent to the at least one longitudinal groove,
the at least one land portion having a ground contact surface defined between a first circumferential edge located on one side of the at least one land portion on the at least one longitudinal groove side and a second circumferential edge located on an opposite side to the first circumferential edge,
the at least one land portion being provided with first lateral grooves and sipes, the first lateral grooves extending in a tyre axial direction from the first circumferential edge and having inner ends thereof terminating within the at least one land portion, the first lateral grooves being provided with tie-bars on the respective inner ends side, the tie-bars having lengths smaller than lengths of the respective first lateral grooves, and the sipes comprising first sipe elements extending from the second circumferential edge to the respective first lateral grooves and second sipe elements extending on the respective tie-bars, wherein each of the first lateral grooves comprises a pair of groove sidewalls extending inwardly in a tyre radial direction from the ground contact surface of the at least one land portion, the pair of groove sidewalls comprises a pair of first portions located on the inner end side of each of the first lateral grooves, in a cross-sectional view of each of the first lateral grooves, the pair of first portions extends from the ground contact surface and is connected to the second sipe element directly, and the pair of first portions, in a cross-sectional view of each of the first lateral grooves, extends in a circular arc shape over its entire length.

18. A tyre comprising:

a tread portion being provided with at least one longitudinal groove extending in a tyre circumferential direction and at least one land portion being adjacent to the at least one longitudinal groove, the at least one land portion having a ground contact surface defined between a first circumferential edge located on one side of the at least one land portion on the at least one longitudinal groove side and a second circumferential edge located on an opposite side to the first circumferential edge, the at least one land portion being provided with first lateral grooves and sipes, the first lateral grooves extending in a tyre axial direction from the first circumferential edge and having inner ends thereof terminating within the at least one land portion, the first lateral grooves being provided with tie-bars on the respective inner ends side, the tie-bars having lengths smaller than lengths of the respective first lateral grooves, and the sipes comprising first sipe elements extending from the second circumferential edge to the respective first lateral grooves and second sipe elements extending on the respective tie-bars, wherein the at least one longitudinal groove has a maximum depth $Da$, the first lateral grooves have a maximum depth $D1$ equal to 20% or more than and 50% or less than the depth $Da$ of the at least one longitudinal groove, a protruding height $h1$ of the tie-bars from groove bottoms of the first lateral grooves is in a range from 30% to 70% of the maximum depth $D1$ of the first lateral grooves, the first sipe elements and the second sipe elements have a same depth $dl$ to each other, and the depth $dl$ of the first and second sipe elements is shallower than the maximum depth $D1$ the first lateral grooves such that the second sipe elements are provided on only the respective tie-bars.

* * * * *